United States Patent Office 2,974,130
Patented Mar. 7, 1961

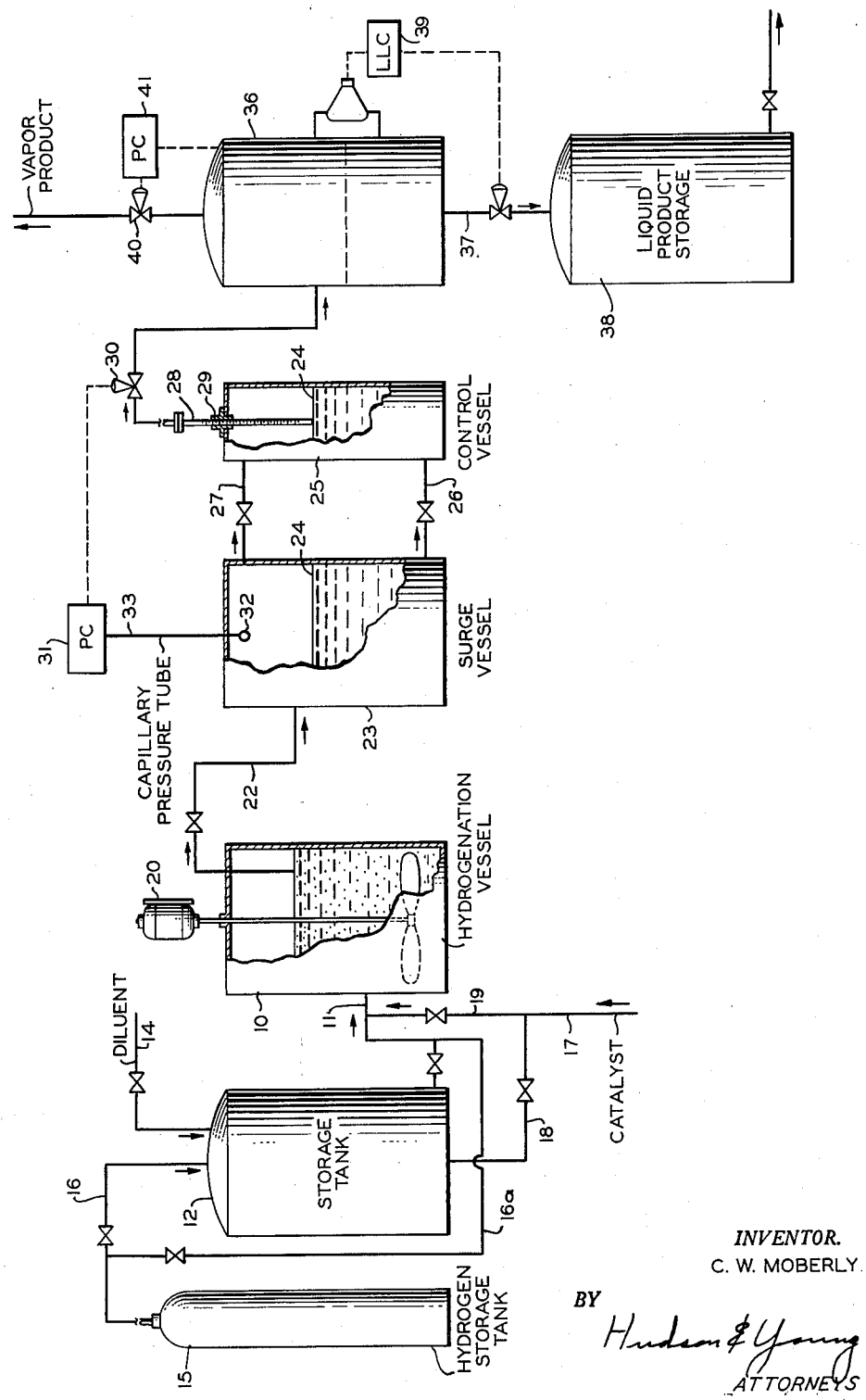

2,974,130

METHOD OF CONTROLLING PRESSURE AND LIQUID LEVEL IN A VESSEL

Charles W. Moberly, Bartlesville, Okla., assignor to Phillips Petroleum Company, a corporation of Delaware Filed Nov. 22, 1954, Ser. No. 470,291

5 Claims. (Cl. 260—94.7)

This invention relates to a method of and apparatus for controlling pressure and liquid level in a vessel.

Heretofore, in process vessels where it was necessary to control both liquid level and pressure, separate and independent controls have been provided for this purpose. In such systems, the liquid level controller and pressure controller have operated independently or, alternately, a rather complicated system of interlocking controls has been provided to ensure the proper regulation of the pressure and liquid level.

I have discovered a very simple system for effecting simultaneous control of liquid level and pressure involving the use of a minimum amount of equipment, and which requires no interlocking devices.

In a broad aspect of the invention, a liquid and vapor, which can be at high pressure, are introduced through an inlet conduit to a vessel and withdrawn through an outlet conduit extending to a predetermined level in the vessel. This outlet conduit is provided with a valve which is operated by a pressure controller sensitive to the variations in pressure within the vessel at a location above such predetermined level. The pressure controller is adjusted to open the valve when the pressure exceeds a predetermined value and to close the valve when the pressure drops below the same or a different predetermined value. In this manner, the discharge of liquid and vapor from the vessel is so regulated as to maintain a predetermined level in the vessel and also a predetermined pressure or range of pressures therein.

This system has valuable application in high pressure liquid phase reactions, such as the catalytic hydrogenation of rubber or polybutadiene, wherein the liquid level can be advantageously controlled along with the pressure in the control vessel.

Finally, I have discovered that smoother operation can be obtained in commercial operations by providing a relatively large surge vessel connected at the top and bottom to the pressure control vessel. The outlet conduit is positioned, as described, in the control vessel and the tap of the pressure controller extends into the vapor phase in the larger vessel to the end that surging is practically eliminated and a very smooth and accurate control of pressure and liquid level is attained.

Accordingly, it is an object of the invention to provide an improved method of and apparatus for controlling liquid level and pressure in a vessel.

It is a further object to provide an improved system of this character utilizing a minimum number of standard components.

It is a further object to provide an improved process for the hydrogenation of polybutadiene incorporating the novel control system of the invention.

Various other objects, advantages and features of the invention will become apparent from the following detailed description taken in conjunction with the accompanying drawing, in which:

The figure is a flow diagram of a system for hydrogenating polybutadiene embodying the control system of this invention.

Referring now to the drawing, I have shown a high pressure hydrogenation reactor 10 to which a reaction mixture is fed through a line 11, this reaction mixture including a dispersion or solution of the rubbery material to be hydrogenated.

In one embodiment of the invention, the rubbery material is polybutadiene which is charged to a storage tank 12 in any suitable manner. This material can be the homopolymer of butadiene, or alternately, it can contain up to 30 parts of styrene per 100 parts of rubber. In a broader aspect of the invention, the material can be a synthetic rubber to be hydrogenated having a Mooney value (ML-4) at 212° F. of 40 or lower. The rubber, where synthetic, can be advantageously produced by emulsion polymerization of monomeric material at a temperature of —15 to +140° F.

In the tank 12, the rubbery material is dissolved in a diluent liquid so that the hydrogenation takes place in the liquid phase. This diluent can be introduced to tank 12 through a valved line 14.

A variety of hydrocarbon materials are suitable as diluents. In particular, suitable diluents are saturated cyclohydrocarbons, such as cyclohexane, methylcyclohexane or decalin; aromatic hydrocarbons such as benzene or toluene, cycloethers such as dioxane; and paraffinic hydrocarbons such as isooctanes, isoheptanes, normal heptane; or mixtures of the foregoing. The amount of diluent is at least sufficient to dissolve the rubber and normally there is 1 to 20 weight percent of rubber in the solution.

The hydrogen is introduced to the tank 12 from a storage vessel 15 through a valved line 16, and it can be advantageously used to pressure the feed into the hydrogenation vessel 10. In the hydrogenation of polybutadiene, hydrogen is required in excess of that used to pressure the feed, and such excess hydrogen is introduced directly to the vessel 10 through a line 16a.

The catalyst can pass from a line 17 either through a valved line 18 to the tank 12 or through a valved line 19 to the charge line 11 of the hydrogenation vessel 10. In some cases, the catalyst is introduced directly into the vessel 10.

The catalyst can be platinum or nickel supported on kieselguhr, copper chromite, Raney nickel, molybdenum sulfide, platinum oxide, copper chromium oxide, or Rufert nickel. It is employed in an amount of 2 to 30 weight percent, on an unreduced basis, of the rubbery material.

In the hydrogenation vessel 10, which is provided with agitation mechanism 20, the reaction takes place at a pressure of 100 to 3000 pounds per square inch gauge and at a temperature of 75 to 1000° F. In commercial operations, the pressure is maintained within the range of 400 to 1000 pounds per square inch gauge, 500 pounds per square inch gauge being an optimum value, and the temperature is maintained within the range of 300 to 600° F., 500° F. being an optimum value. The reaction time can be from one to twenty-four hours, two to eight hours being utilized in commercial operations.

Under these conditions, a hydrogenated polybutadiene can be readily produced having an unsaturation within the range of 0 to 50% of theoretical, as compared to an unsaturation of about 95% of theoretical in the starting material. In commercial operations, the hydrogenated polybutadiene normally has an unsaturation of 5 to 30%.

From the foregoing discussion, it will be appreciated that the operation can be carried out either batchwise or continuously. In a batch operation, the reactants and catalyst are merely charged to the vessel 10 and stirred therein for the desired reaction time. When operating continuously, the reactants are charged continuously to tank 12 and, thence, fed continuously to the vessel 10, the catalyst either being added to the charge line 11, admixed with the reactants in the tank 12, or added directly to the vessel 10.

The hydrogenated rubber dispersed in diluent is withdrawn as a liquid slurry through a conduit 22 together with gaseous material, predominately hydrogen, and passed into a surge vessel 23. A predetermined liquid level, as indicated at 24, is maintained in this vessel by the hereafter described operation of my control system. Advantageously but not necessarily, a separate pressure control vessel or tank 25 is provided alongside the surge vessel 23, this control vessel being of much smaller volume than that of the vessel 23. Where the vessel 25 is utilized, its bottom portion is connected by a valved line 26 to a portion of the vessel 23 below the liquid level 24 therein, and the top part of the surge vessel is connected by a valved line 27 to a portion of the vessel 23 above the liquid level 24 therein.

In accordance with the invention, an outlet conduit 28 extends into the vessel 25, where such is used, through a sealed threaded fitting 29. Where the separate surge vessel is not employed, the conduit 28 extends through a similar threaded connection into the vessel 23. The outlet conduit 28 is provided with an automatic valve 30 which is operatively connected to a pressure controller 31. The controller 31 has a pressure tap 32 connected thereto by a capillary pressure tube 33, and the tap 32 is located within the vessel 23 at a region above the liquid level 24.

The outlet conduit 28 extends to a low pressure vessel 36 from which a liquid product is withdrawn through a valved line 37 to a liquid product storage tank 38 under the control of a liquid level controller 39 while a vapor product is withdrawn from low pressure vessel 36 through a valved line 40 under the control of a pressure controller 41.

In operation, the controller 31 is set to maintain a predetermined pressure or range of pressures within the vessel 23. This maintains a different higher, substantially constant pressure in the reactor 10 sufficient to overcome the pressure drop in line 22. When the pressure in vessel 23 rises above this predetermined value, the valve 30 opens to permit material to leave the vessel 25, and when the pressure falls below this predetermined value, the valve closes to prevent passage of material from vessel 25. If the liquid level is above the lower end of tube 28 at the time the valve is open, the liquid is discharged through tube 28 until the liquid level is below the lower end of tube 28. Thereupon, gas is discharged through the tube until the pressure in vessel 23 is reduced to below said predetermined value, at which time the valve closes.

In this manner, the pressure within the vessel 23 is maintained substantially at the predetermined value set by controller 31, and the liquid level in vessels 23, 25 is maintained at the lower end of the pipe or conduit 28. It will be understood that this predetermined liquid level can be varied by adjusting the vertical position of outlet conduit 28 in the threaded fitting 29.

Moreover, where it is desired to maintain a predetermined range of pressures, rather than a single predetermined pressure in the vessels, controller 31 can be adjusted to open valve 30 at a first predetermined pressure at the high end of the desired pressure range and to close valve 30 at a second predetermined pressure at the low end of the desired range.

In commercial operations, the use of the separate surge vessel 23 is very advantageous in preventing "hunting" or overshooting of the control system, thus providing a smoother operation and a more accurate control of level and pressure. However, in a broader aspect of the invention, one vessel can be eliminated and the outlet conduit 28 positioned at a predetermined level within the vessel 23.

It will further be recognized that the described system is particularly advantageous where used in connection with a plant for the production of hydrogenated rubber by catalytic hydrogenation. However, the apparatus of the invention has broad utility in other fields where it is desired to obtain continuous and conjoint control of pressure and liquid level, the control thus exercised being particularly effective where the control vessel is preceded by a high pressure liquid phase reactor.

In one specific example, the control system of the invention was used in the hydrogenation of polybutadiene. In this hydrogenation process, 800 grams of 41° F., 20 Mooney polybutadiene were dispersed in methyl cyclohexane and 160 grams of nickel-kieselguhr catalyst were added, the final volume being 16 liters. This mixture was fed to stirred reactor 10 at the rate of 1.7 liters per hour. The pressure maintained on vessels 23 and 25 was 500 pounds per square inch gauge.

Hydrogen was fed to reactor 10 at the rate of two cubic feet per hour, while a temperature of 500° F. was maintained in vessels 10, 23 and 25. A stream of excess hydrogen gas and hydrogenated polybutadiene flowed from reactor 10 to vessel 23 through line 22. As the liquid level in vessels 23 and 25 built up over the end of line 28, the pressure within vessels 10, 23 and 25 built up past the set pressure of controller 31 which in this case was 500 pounds per square inch gauge. Controller 31 then opened motor valve 30, and the pressure forced the dispersion of hydrogenated polybutadiene through line 28 to vessel 36. When the liquid level had dropped past the end of line 28, hydrogen gas passed through line 28 to vessel 36.

As the pressure dropped below the set pressure of controller 31, motor valve 30 closed and the operation then repeated itself.

The procedure used was found to control pressure and liquid level very well, and the pressure was held at approximately 500 pounds per square inch gauge. The rubber that was to be hydrogenated had an unsaturation of 94.9 percent, while the hydrogenated product had an unsaturation of 25.9 percent.

While the invention has been described in connection with present, preferred embodiments thereof, it is to be understood that this description is illustrative only and is not intended to limit the invention.

I claim:

1. The process of regulating pressure and liquid level in a first confined zone containing a liquid phase in the lower region thereof and a vapor phase in the upper region thereof which comprises continuously introducing a mixture of vapor and liquid to said first zone; measuring the pressure of the vapor phase within said first zone; withdrawing fluid from said first zone through a confined path which originates at a second zone within said first zone, located intermediate the top and bottom of said first zone, when the measured pressure exceeds a predetermined value; and terminating flow of fluid through said confined path when the measured pressure becomes less than a predetermined value.

2. The process of regulating pressure and liquid level in a first confined zone containing a liquid phase in the lower region thereof and a vapor phase in the upper region thereof which comprises continuously introducing a mixture of vapor and liquid to said first zone; producing an output signal representative of the pressure of the vapor phase within said first zone; withdrawing fluid from said first zone through a confined path which originates at a second zone within said first zone, located intermediate the top and bottom of said first zone, in response to said output signal when said output signal exceeds a preselected value; and throttling flow of fluid through said confined path in response to said output signal when said output signal becomes less than a predetermined value.

3. The process of regulating pressure and liquid level in a first confined zone containing a liquid phase comprising a hydrogenated rubber in the lower region of said first zone and a vapor phase comprising hydrogen in the upper region of said first zone which comprises continuously introducing a mixture of hydrogen and a hydrogenated rubber dispersion into said first zone; measuring the pressure of the vapor phase within said first zone; withdrawing fluid from said first zone through a confined path which originates at a second zone within said first zone, located intermediate the top and bottom of said first zone, when the measured pressure exceeds a predetermined value; and terminating flow of fluid through said confined path when the measured pressure becomes less than a predetermined value.

4. A method of preparing hydrogenated rubber which comprises charging polymeric material containing 70–100 weight percent combined butadiene and 0–30 weight percent styrene, a rubber hydrogenation catalyst, hydrogen, and a diluent to a hydrogenation zone; withdrawing a stream containing hydrogenated rubber and hydrogen from said hydrogenation zone and introducing same into a confined zone, whereby a liquid phase is formed in the lower region of said confined zone and a vapor phase is formed in the upper region thereof; measuring the pressure of the vapor phase within said confined zone, withdrawing fluid from said confined zone through a confined path which originates at a third zone within said confined zone, located intermediate the top and bottom of said confined zone, when the measured pressure exceeds a predetermined value; terminating flow of fluid through said confined path when the measured pressure becomes less than a predetermined value; and introducing the fluid withdrawn through said confined path into a separation zone which is maintained at a pressure substantially lower than the pressure in said confined zone; and separating fluid in said separation zone into a hydrogenated rubber product and a vapor product containing hydrogen.

5. A method of producing a hydrogenated rubber which comprises charging polybutadiene having a Mooney value (ML–4) at 212° F. of less than 40, and 2 to 30 weight percent, on an unreduced basis, of a nickel catalyst supported on kieselguhr together with methylcyclohexane as a diluent and hydrogen to a hydrogenation zone; withdrawing a stream containing hydrogenated rubber dissolved in said methylcyclohexane together with hydrogen to a confined zone; maintaining a pressure of 400 to 1000 pounds per square inch gauge and a temperature within the range of 300 to 600° F. in said hydrogenation zone and said confined zone; measuring the pressure of the vapor phase within said confined zone; withdrawing fluid from said confined zone through a confined path which originates at a third zone within said confined zone, located intermediate the top and bottom of said confined zone, when the measured pressure exceeds a predetermined value; terminating flow of fluid through said confined path when the measured pressure becomes less than a predetermined value; and separating the fluid withdrawn through said confined path into a gaseous product and a liquid product in a fourth zone which is maintained at a pressure lower than that existing in said confined zone.

References Cited in the file of this patent

UNITED STATES PATENTS

| | | |
|---|---|---|
| 2,046,160 | Graves | June 30, 1936 |
| 2,046,257 | Flint | June 30, 1936 |
| 2,160,062 | Drake et al. | May 30, 1939 |
| 2,325,067 | Marks | July 27, 1943 |
| 2,585,583 | Pinkney | Feb. 12, 1952 |
| 2,693,461 | Jones | Nov. 2, 1954 |
| 2,743,233 | Fisher | Apr. 24, 1956 |
| 2,890,156 | Vautrain | June 9, 1959 |